United States Patent [19]
Repper, deceased et al.

[11] Patent Number: 4,779,390
[45] Date of Patent: Oct. 25, 1988

[54] LINING FOR THE INTERIOR OF AN AUTOMOTIVE VEHICLE

[75] Inventors: Helmut Repper, deceased, late of Ingolstadt, Fed. Rep. of Germany, by Marie A. Repper, heiress; Wilfried Engel; Karl Trübenbach, both of Ingolstadt, Fed. Rep. of Germany

[73] Assignee: Audi AG, Ingolstadt, Fed. Rep. of Germany

[21] Appl. No.: 837,309

[22] Filed: Mar. 7, 1986

Related U.S. Application Data

[63] Continuation-in-part of Ser. No. 589,899, Mar. 15, 1984, abandoned.

[30] Foreign Application Priority Data

Mar. 15, 1983 [DE] Fed. Rep. of Germany ....... 3309131

[51] Int. Cl.$^4$ .................. E04B 1/00; B62D 25/14
[52] U.S. Cl. ........................................ 52/222; 296/70; 296/39.2
[58] Field of Search ............. 52/222, 273, 783, 784, 52/811, 813; 160/391, 395; 296/70, 72, 39 R, 31 P

[56] References Cited

U.S. PATENT DOCUMENTS

| | | | |
|---|---|---|---|
| 851,343 | 4/1907 | Caldwell | 52/222 |
| 1,802,835 | 4/1931 | Roberts . | |
| 1,945,130 | 1/1934 | Beiger | 52/784 |
| 1,996,479 | 4/1935 | McCowan | 52/813 |
| 2,036,390 | 4/1936 | Bowers . | |
| 2,291,935 | 8/1942 | Woodall et al. . | |
| 2,597,401 | 5/1952 | Swanson . | |
| 2,660,499 | 11/1953 | Norquist | 52/783 |
| 2,797,448 | 7/1957 | Revell et al. | 52/811 |
| 2,877,877 | 3/1959 | Davis, Jr. . | |
| 2,888,983 | 6/1959 | Toti | 52/222 |
| 2,892,516 | 6/1959 | Kessler | 52/811 |
| 2,896,271 | 7/1959 | Kloote et al. | 296/31 P |
| 3,080,022 | 3/1963 | Mote . | |
| 3,131,442 | 5/1964 | Persson-Melin | 52/222 |
| 3,336,705 | 8/1967 | Vecchiarelli . | |
| 3,513,613 | 5/1970 | Jones et al. . | |
| 3,605,370 | 9/1971 | Prible . | |
| 3,657,850 | 4/1972 | Billarant . | |
| 3,780,479 | 12/1973 | Billarant et al. | 52/222 |
| 3,783,931 | 1/1974 | Assael . | |
| 3,816,199 | 6/1974 | Dawdy et al. . | |
| 3,817,015 | 6/1974 | Frangos | 52/222 |
| 3,953,067 | 4/1976 | Isola | 52/222 |
| 4,333,284 | 6/1982 | Meadows . | |
| 4,473,982 | 10/1984 | Monari | 52/222 |
| 4,546,584 | 10/1985 | Mieyal et al. | 52/222 |

FOREIGN PATENT DOCUMENTS

| | | | |
|---|---|---|---|
| 639500 | 4/1962 | Canada | 52/222 |
| 118796 | 9/1984 | European Pat. Off. | 296/39 R |
| 430943 | 6/1926 | Fed. Rep. of Germany . | |
| 1734939 | 11/1956 | Fed. Rep. of Germany . | |
| 1746372 | 6/1957 | Fed. Rep. of Germany . | |
| 2509368 | 9/1975 | Fed. Rep. of Germany | 296/39 R |
| 94861 | 7/1980 | Japan | 296/39 R |
| 142760 | 11/1981 | Japan | 296/31 P |
| 101052 | 6/1983 | Japan | 296/39 R |
| 221737 | 12/1983 | Japan | 296/39 R |

Primary Examiner—David A. Scherbel
Assistant Examiner—Michael Safavi
Attorney, Agent, or Firm—Karl Hormann

[57] ABSTRACT

A lining for the interior of an automotive vehicle, comprising a unitary foundation panel partitioned into at least two contiguous surface areas by a groove penetrating into the surface. Webs of materials different from each other are laminated to the areas, and a seam is provided between them by tucking portions thereof into the groove.

16 Claims, 5 Drawing Sheets

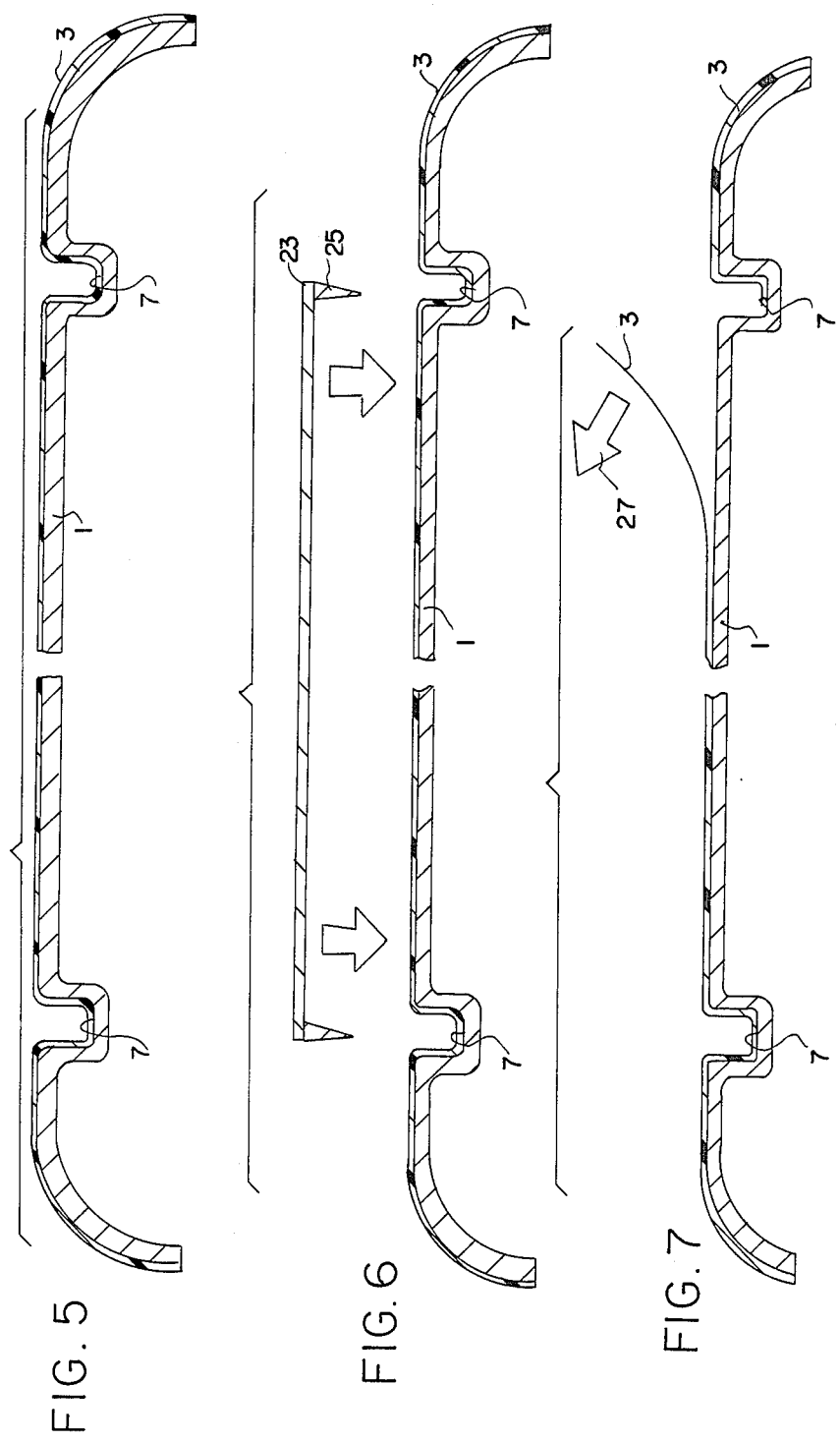

LINING FOR THE INTERIOR OF AN AUTOMOTIVE VEHICLE

PRIOR APPLICATIONS

This is a continuation-in-part of application Ser. No. 589,899 filed Mar. 15, 1984, abandoned.

BACKGROUND OF THE INVENTION

The invention disclosed herein relates to interior linings for automobiles. More particularly, the invention relates to such linings in which two or more webs of similar or different materials are used to cover contiguous surface areas of a unitary foundation panel and are joined by a seam of attractive appearance.

Linings to cover otherwise unattractive surfaces of panels are, of course, well known. They are in common usage in the building trade in general, and in the automotive industry, in particular. In this latter respect, linings have been used not only to render the interior of passenger cabins pleasant in appearance, but they have also become indispensable as a tool for insulating the interior of such cabins from exterior noise and climatic conditions.

In the early days of automotive engineering, such linings were commonly made of textile fabrics applied to support structures by means of so called risers to which they were applied sometimes by adhesive but usually by stitching or by means of more or less elaborate tacks, pins, and the like.

As adhesives became more reliable and man-made plastic foils improved in terms of appearance, longevity and smell, they were adopted by the industry as lining materials because of their cost effectiveness. For constructing linings of different web materials, such as, for instance, plastic foils and textile fabrics, it has been common practice to provide a welded seam at the junction or interface of two such different materials, and the resultant seams provide a finish of acceptable appearance. The composite lining may be made by applying an adhesive coating to the appropriate surface area of a foundation panel. A pre-cut textile fabric web is then superposed on the adhesive coating. Thereafter, those surface areas of the foundation panel which are not covered by the fabric are laminated with a plastic foil in a well-known manner, for instance, by vacuum pressure. The fabric web and the plastic foil are then bonded together at their edges by high frequency welding. By sufficiently plasticizing or softening the plastic foil, an intimate bond with the fabric web may be formed by a welding electrode. When the electrode is moved along the seam, a blade mounted on the electrode may either remove excess foil protruding into the fabric-covered area, or it may provide a tear-line in the foil to permit manual removal of any excess. Thus, a seam of neat appearance may be formed between the two different web materials.

Such composite linings have found acceptance in the industry, but they suffer from certain deficiencies and disadvantages. For example, they can only be made from materials which are compatible with each other. For practical purposes, leather cannot be used at all. In those instances, however, in which incompatible materials, such as textile fabrics on the one hand and leather on the other, have been used for the construction of linings, they usually are mounted on separate support panels for subsequent assembly in adjacent relationship, usually by clips, tacks, or the like. This is a time-consuming process, for it requires careful alignment of the separate support panels in order to yield joints of acceptable appearance. Owing to the relatively many elements making up such linings and because of the great skill required for their mounting and assembly, they are expensive.

Welded seams of the kind referred to may for other reasons not always be acceptable. Indeed, they may be useful only where the webs joined by them lie in substantially the same plane. They are not easily adaptable, however, for bonding upholstered, i.e., raised portions to flat portions, for instance. In any event, welded seams require elaborate precautions and monitoring with respect to welding pressure, current strength and high frequency fields in order to prevent burns and other defects in the seam. Such complications and the high cost attendant to avoiding defects resulting therefrom, may be the reason why composite linings have not found as wide an acceptance as might otherwise be the case.

It is, therefore, an object of the invention to provide a novel interior lining for automotles, comprising different web materials.

A further object of the invention resides in the provision of novel means for constructing a lining of different materials in a economical and attractive manner.

It is another object of the invention to provide an interior lining comprising different web materials mounted on contiguous surface areas of a unitary foundation panel.

Yet another object of the invention resides in a lining made up of different web materials, some of which may be applied to upholstered portions of a unitary foundation panel.

A further object of the invention is to provide an interior lining of different webs for automotive vehicles which do not require a welded seam.

A still further object of the invention resides in an interior lining for automotive vehicles made up of different web materials positioned in different planes of a unitary foundation panel.

Yet another object of the invention resides in a lining made up of different web materials, some of which may be provided with an integral layer of resiliently compressible foam material to impart an upholstered appearance to portions of such lining.

It is also an object of the invention to provide a composite lining made in part of leather and in part by another web material.

SUMMARY OF THE INVENTION

In the accomplishment of these and other objects the invention, in a particularly advantageous embodiment thereof, provides for a lining comprising a unitary foundation panel including at least two contiguous surface areas partitioned by a groove penetrating into the panel to a predetermined depth, a substantially limp first web superposed on one of the surface areas in intimate contact therewith and having a portion inserted the groove, a second web superposed on another of the surface areas in intimate contact therewith and having a marginal portion of a width less than the depth of the groove and inserted therein, and means for retaining the portions of the first and second webs in the groove. Preferably, the webs consist of materials different from each other. One of the webs may be leather, the other one may be a textile fabric or a plastic foil; or one of the webs may be a textile fabric and the other may be a plastic foil. One of the webs may be provided with a resiliently compressible layer of a foam material for engagement with the panel. The portion of the first web may be a marginal portion and the margin of the first and second webs may be tucked into the groove and retained therein by press-fitting or by adhesive. The groove may also be configured to retain a molding strip in addition to the portions of the webs. It is also within the ambit of the invention that one of the surface areas of the foundation panel may be elevated with respect to the other surface area so that, when it is covered, it may give the appearance of being upholstered. In yet another embodiment of the invention, one of the webs may cover both surface areas of the foundation panel and may be provided with a crease inserted into the groove and the other one of the webs may be superposed on the one web in one area of the foundation panel and have its marginal portion inserted into the crease. One or all of the webs may be retained on the respective surface areas of the foundation panel by means of adhesive.

DESCRIPTION OF THE DRAWINGS

The novel features considered characteristic of the invention are set forth with particularity in the appended claims. The invention itself, however, in respect of its organization as well as its method of operation, together with other objects, will become apparent from the following description of preferred embodiments and read in connection with the accompanying drawings, in which:

FIG. 5 is a cross-sectional view of the foundation panel with a foil applied to one of its surfaces;

FIG. 6 is a schematic view, in cross-section, of the lining of FIG. 5 with a tool for removing part of the applied foil;

FIG. 7 is a schematic view, in cross-section of the removal of part of the foil from the lining of FIG. 5;

DETAILED DESCRIPTION OF PREFERRED EMBODIMENTS

Figure 1:
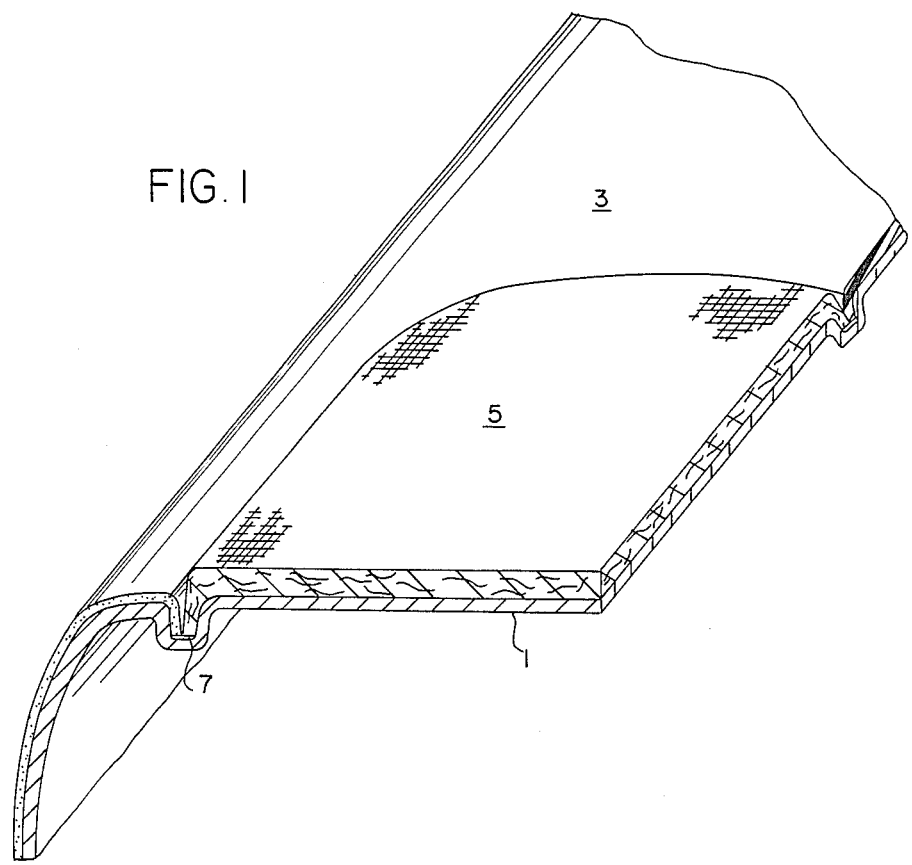
FIG. 1 is a fractional perspective cross-sectional view, of a lining in accordance with the invention, for the interior of an automotive vehicle.

FIG. 1 depicts a lining for use with a door (not shown) of an automotive passenger vehicle. The lining comprises a unitary foundation panel 1 which is partitioned into two contiguous surface areas by a preferably preformed groove 7. The panel 1 may be made of a rigid material, such as metal, or fibrous press board of the kind well known in the art. One of the surface areas is covered by a web 3 such as a plastic foil which is laminated to the panel. The foil may be made, for instance, of polyvinylchloride (PVC); but it may also be a textile or leather. The other surface area not covered by the foil 3, is laminated by another web 5, such as a textile fabric or leather hereinafter referred to as fibrous web. The groove 7 is uninterupted throughout its length and follows or defines the contours of the foil 3 and of the fibrous web 5. Marginal portions of the foil 3 and of the fibrous web 5 are inserted into the groove 7, the width of the groove 7 being less than the combined thickness of the foil 3 and the web 5, such that the marginal portions are retained therein by a tight fit. The depth of the groove 7 is dimensioned to be not less than the width of the marginal portions of the foil 3 and of the fibrous web 5. For purposes which will appear hereinafter, the unitary foundation panel 1 is preferably perforated by small openings (not shown).

Figure 4:
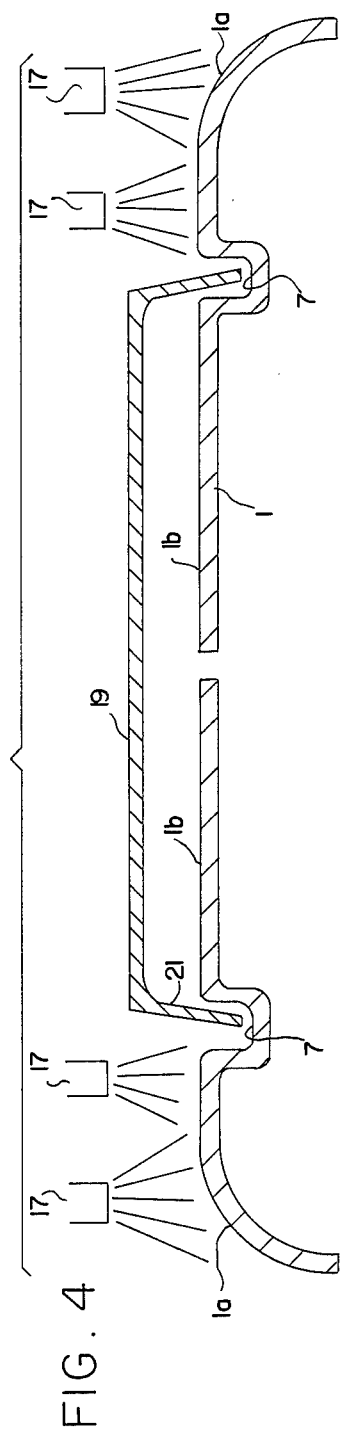
FIG. 4 is a schematic view in cross section, depicting the application of adhesive to portions of the panel shown in FIG. 3.
Figure 8:
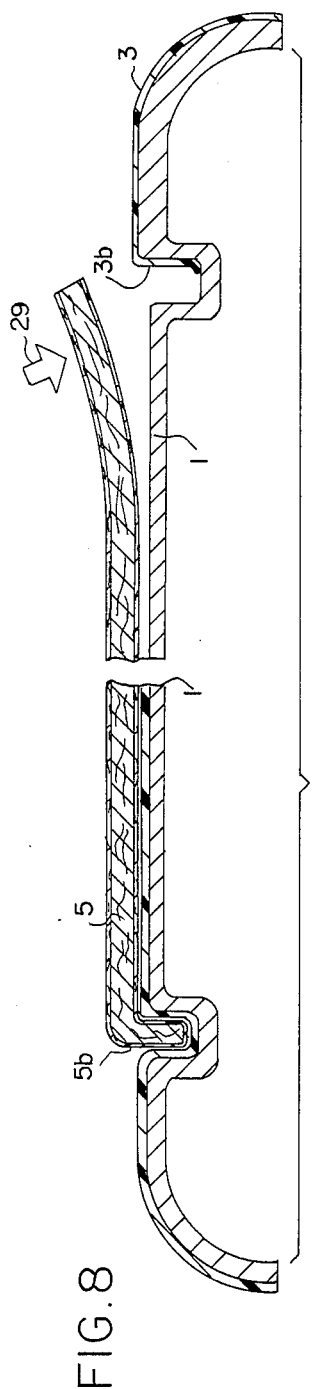
FIG. 8 is a schematic view, in cross section, showing the application of a fibrous web to the surface area of the foundation panel from which the foil has been removed.

The foil 3 and the fibrous web 5 may preferably be mounted on, or laminated to, their respective surface areas of the foundation panel 1 by a method the principle of which is schematically depicted in FIGS. 4–8. As shown in FIG. 4, adhesive is applied by spray jets 17, only to the portion 1a of the panel 1 which is to be laminated by the foil 3. The other surface area 1b of the panel 1 which is subsequently to be covered by the fibrous web 5 is protected from adhesive application by a cover member 19 which is provided with a depending marginal rim 21 configured to be inserted into the groove 7. After the adhesive has been applied to the panel portion 1a, the cover 19 is removed and the surface area of the entire panel is laminated with the foil 3 by first placing it on the surface of the panel 1 and thereafter subjecting it to vacuum pressure from the opposite surface of the panel 1 through the above-mentioned perforations. In this manner, the foil 3 may be drawn into intimate contact with the upper surface of the panel 1. Intimate contact between the panel 1 and the foil 3 is of especial importance in the area of the groove 7. It is to be noted that neither the process nor the adhesive by which the foil 3 is applied to the panel 1 forms part of the invention herein disclosed.

Subsequent to laminating the foil 3 to the panel 1 the portion of the foil 3 covering area 1b of the panel 1 is removed. This may advantageously be done by a cutting die 23 having substantially the same contour as the rim 21 of the cover 19. By controlled movement of the cutting edge 25 of the die 23 through the foil 3 at the bottom of the groove 7, without cutting into or otherwise damaging the panel 1, the portion of the foil 3 covering portion 1b of the panel 1 is severed from the portion of the foil 3 covering panel portion 1a, and may, as shown in FIG. 7, be removed after the cutting die 23 has been moved aside. Removal of excess foil 3 may be accomplished by a peeling motion as is represented schematically by the arrow 27 in FIG. 7.

Once the excess foil has been removed as described, a precut blank of a fibrous web 5 may be applied to the surface area 1b of the panel 1. The fibrous web 5, on its surface to be engaged by the panel 1, is preferably provided with an adhesive appropriate for the purpose. The web 5 may additionally be provided with an integral layer of resiliently compressible foam material as described below. The blank of the web 5 is dimensioned to have a marginal portion 5b intended for insertion into the groove 7. The web 5 is laminated to the panel 1 by pressure as schematically depicted by the arrow 29 in FIG. 8. As shown, a marginal portion 3b of the web 3 was left in the groove. The marginal portion 5b of the fibrous web 5 is tucked into the groove after the web 5 has been properly laminated to the panel 1. The width of the groove 7 may be somewhat less than the combined thickness of the marginal portions 3b of the foil and 5b of the fibrous web 5, thus providing for a tight joint between both webs. However, as decribed infra in connection with alternate embodiments, the groove 7 may also be dimensioned to receive a molding strip in addition to the marginal portions 3b and 5b of the foil 3 and web 5.

While the described method of laminating the foil 3 and the web 5 to the panel 1 and of inserting their marginal portions 3b and 5b into the groove 7 is at present preferred, it is, of course, possible to employ different processes. For instance, it would be possible first to apply an adhesive to that area of the panel 1 which is to be covered by the fibrous web 5. The web 5, precut to a predetermined pattern, may be positioned on the adhesive coating and its marginal portion 5b may be tucked into the groove 7 with an appropriate tool (not shown). As will be appreciated by those skilled in the art, the groove 7 is preferably preformed in the panel 1. Once the web 5 has been laminated to the panel 1, and its marginal portion has been inserted into the groove 7, the foil 3 is laminated to the panel 1 in any well known manner, such as by vacuum pressure. Any portion of the foil 3 protruding excessively into the area covered by the web 5 may subsequently be removed by a tracing and cutting tool (not shown) in such a manner that a margin of a width substantially equal to or less than, the depth of the groove 7 remains. The margin may then be inserted into the groove 7 to provide the same kind of seam between the two webs as described above. A further method may be to apply an adhesive to the entire surface of the panel before either web is laminated to it.

Figure 2:
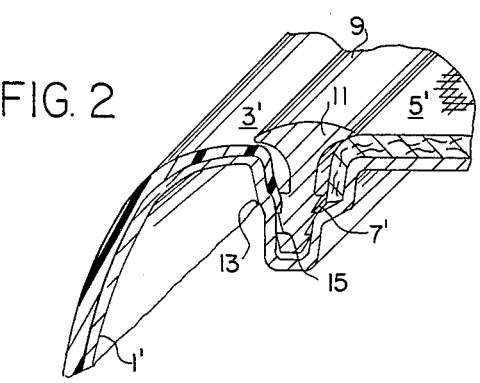
FIG. 2 is a fractional perspective view of a further embodiment of the invention of a lining with a molding strip in the joint between different lining materials.
Figure 3:
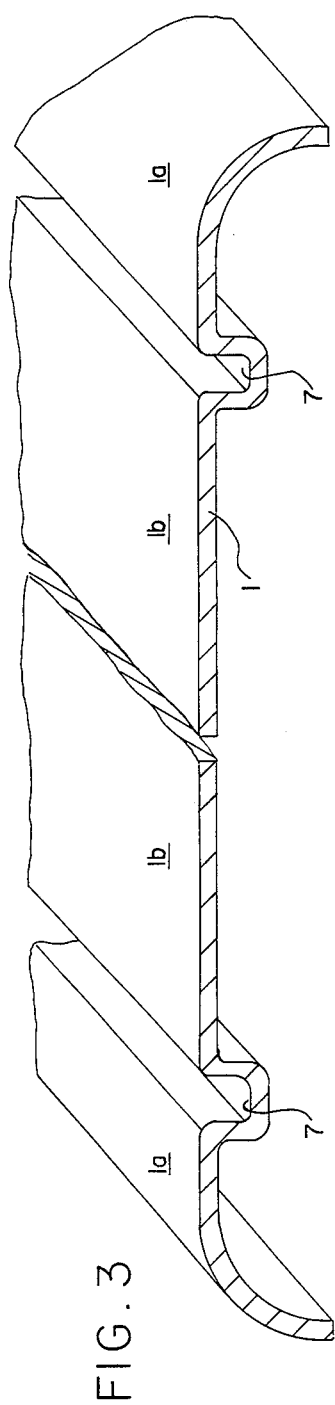
FIG. 3 is cross-section, in perspective, of a unitary foundation for use with a lining in accordance with the present invention.

FIG. 2 depicts an embodiment of the invention in which a unitary foundation panel 1' is partitioned into two contiguous surface areas by a groove 7' which in cross-section is of a step-like configuration, narrow at 35 the bottom and flaring out at its throat. The panel 1' is covered by webs 3' and 5' which may be of the same materials as those of the previous embodiment; but in this embodiment the marginal portions of the webs are additionally secured in the groove 7' by a molding strip 9 provided with an integral head portion 11 which serves to bridge any gap between the webs 3' and 5', and, possibly, exert a clamping force thereon, that is to say that the marginal portions may be retained within the groove 7' by the molding strip with or without adhesive.

As depicted, the marginal portions of foil 3' and of the fibrous web 5' penetrate into the groove 7' no further than its first step 13, thus providing free space at the bottom of the groove 7' where a leg 15 of the molding strip 9 provided with radial teeth may be squeezed into direct contact with the walls of the groove 7' and retained there.

Figure 9:
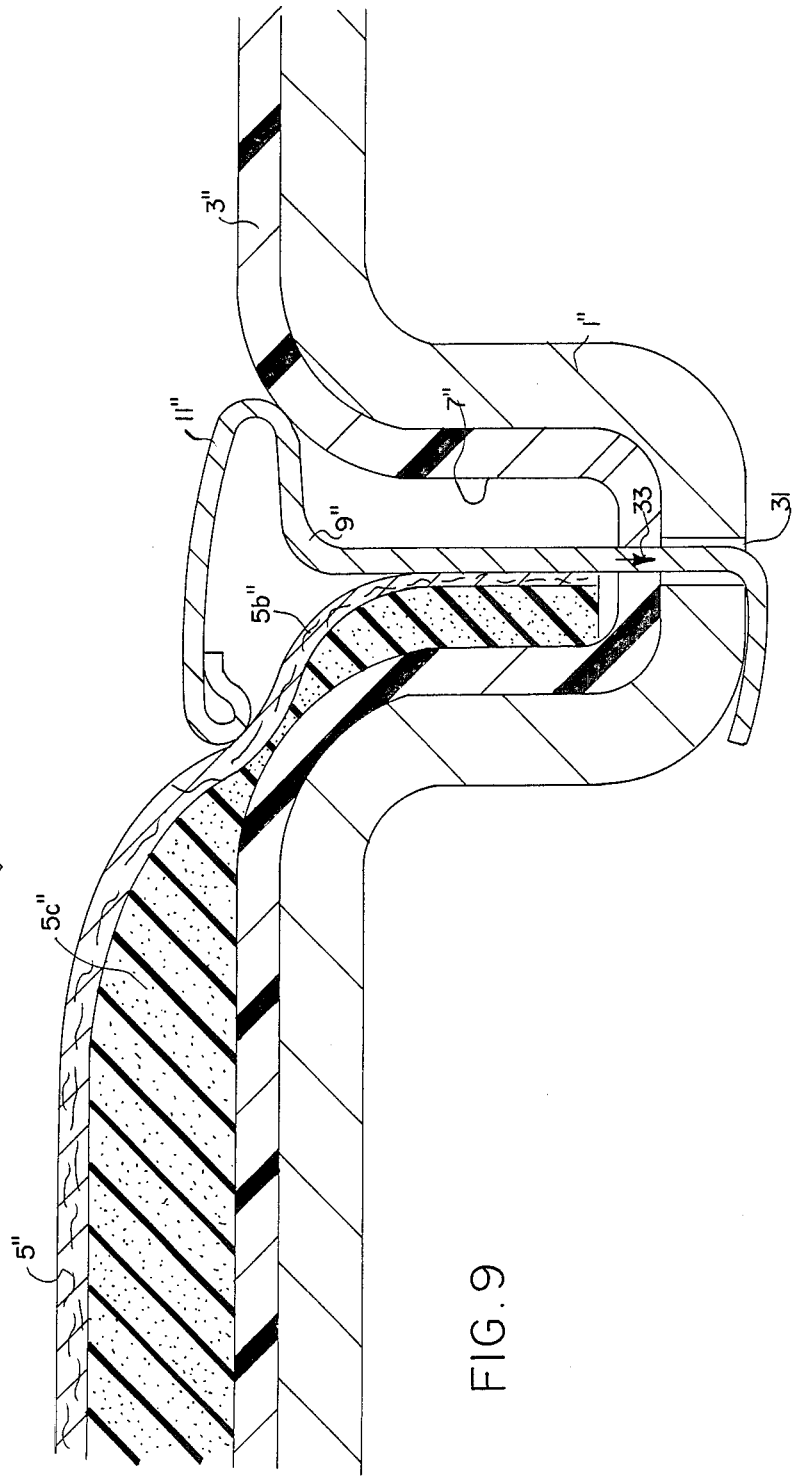
FIG. 9 is a cross sectional view of an alternate embodiment of the lining shown in FIG. 2.

A further embodiment of the invention is shown in FIG. 9. In this embodiment a unitary foundation panel 1" is provided with a groove 7" in the manner of the previously described embodiments. However, both contiguous surface areas defined by the groove 7", including the groove 7" itself, are laminated by a unitary web 3" which may be of the same material as mentioned in the previous embodiments. One of the surface areas of the panel 1" is additionally covered by another web 5" which is shown to be provided with an integral layer 5c" of compressible foam but may also be of the materials referred to above. That is to say, the fibrous web 5" is laminated to the foil web 3" in one area of the panel 1" with the foam layer 5c" in between. A marginal portion 5b" of the web 5" including its foam layer 5c" is seen to penetrate into the groove 7" and is retained therein by a molding strip 9" having a head portion 11" comprising two shoulders which are preferably resilient, one of which engages the marginal portion 5b" of the web 5" to press it against the throat of the groove 7". The other shoulder of the head 11" presses against the plastic foil 3" at the side of the groove opposite from the web 5". The groove 7", at its bottom, is provided with openings 31 at regular intervals, and the molding strip 9" is provided with extensions 33 spaced at intervals equal to the openings 31. The extensions 33 penetrate through the openings 31 and are then peened over against the panel 1 in order to secure the molding strip 9" and press its head portion 11" against the webs 3" and 5".

While the embodiment of FIG. 9 has been described as being provided with a molding strip 9" and with a foam layer 5c" it will be clear that neither is required but that, instead, a plain web 5" may be superposed on the unitary web 3". The marginal portion 5b" may be held by friction or by adhesive, in the manner described above, between the portion of the web 3" penetrating into the groove 7".

Figure 10:
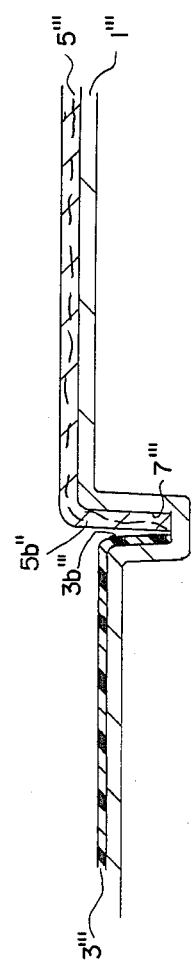
FIG. 10 is a cross-sectional schematic view of a further embodiment of a lining in accordance with the invention.

FIG. 10 depicts yet another embodiment showing a unitary foundation panel 1''' having two contiguous surface areas partitioned by a groove 7'''. One of these surface areas is elevated with respect to the other surface area and, as shown, the elevated surface is preferably laminated with a fibrous web 5''', a marginal portion 5b''' of which penetrates into the groove 7'''. The lower surface area of the panel 1''' is preferably laminated with a plastic foil 3''' also having a marginal portion 3b''' penetrating into the groove 7'''. As in the first desribed embodiment, the width of the groove 7''' is less than the combined thickness of the marginal portions 5b''' and 3b''' of the laminating webs. The purpose of the elevated potion of the panel 1''' is to simulate an upholstery effect.

As will be apparent to those skilled in the art, the embodiments of he invention avoid welding seams of the kind hitherto in common use, as well as the elaborate provisions required for their manufacture. Since no heat treatment is necessary in its practice, the invention avoids any restrictions on the kinds of materials which may be used for forming the composite linings, as indicated, even leather may now be used. Also, the junction between the webs need no longer be located in a common plane.

For instance, and as indicated by the embodiment depicted in FIG. 10, it is possible to provide an elevated portion in the panel surrounded by a groove and thus to, simulate upholstery in a very simple manner.

It will be appreciated that the present invention owing to the novel seam or joint provided thereby, may be practiced with practically any kind of surface covering webs even those which do not leand themselves to conventional joining or bonding techniques, and that it is of particular advantage where leather is to be used as part of the lining. The absence of heat in the process of forming a seam between the different lining materials is of great advantage. The seams or joints provided in accordance with the invention may be formed with or without molding strips similar to those discussed above, for it will be understood that a tight fit between the portions of the webs seated in the grooves is substantially all that is required to provide securely connecting the webs.

The foregoing description of the invention will make it apparent to those skilled in the art that various modifications and improvements can be wrought without departing from the scope of the invention. The embodiments described herein are illustrative only and are not to be considered as limiting the scope of the invention which is to be determined by the appended claims.

What is claimed is:

1. A lining for interior portions of an automotive vehicle, comprising:
   support means comprising a substantially rigid unitary foundation panel including a substantially uninterrupted groove penetrating into said panel to a predetermined depth and partitioning said panel into first and second contiguous surface areas;
   substantially limp foil means covering at least said first surface area and having a portion inserted in said groove;
   substantially limp fibrous web means positioned over said second surface area and having a marginal portion of a width not exceeding the depth of said groove and inserted therein; and
   means for providing a joint-like appearance between said foil means and said fibrous web means by pressing said portion of said foil means and said marginal portion of said fibrous web means against said panel.

2. The lining of claim 1, wherein said portion of said foil means comprises a marginal portion of a width not exceeding the depth of said groove and inserted therein.

3. The lining of claim 2, wherein said marginal portions have a combined thickness in excess of the width of said groove, whereby said marginal portions are retained in said groove by a press fit.

4. The lining of claim 3, wherein said marginal portions are additionally retained in said groove by adhesive.

5. The lining of claim 1, wherein said means for providing a joint-like appearance includes a molding strip comprising a foot portion seated in said groove near the bottom thereof and a head portion bridging said groove and engaging said foil means and said fibrous web means.

6. The lining of claim 1, wherein one of said at least two contiguous surface areas has a three-dimensional contour.

7. The lining of claim 2, wherein said groove has a bottom and tapers in a step-like configuration towards said bottom and wherein a lower portion of said groove adjacent said bottom is adapted frictionally to engage a portion of said molding strip, and wherein an upper portion of said groove is adapted to retain said marginal portions of said foil means and of said fibrous web means with said molding strip therebetween.

8. The lining of claim 1, wherein said fibrous web means comprises a textile fabric.

9. The lining of claim 1, wherein said fibrous web means comprises leather.

10. The lining of claim 1, wherein one of said foil means and said fibrous web means comprises a layer of resiliently compressible foam material in facing relationship to said foundation panel.

11. The lining of claim 1, wherein said foundation panel comprises perforations.

12. The lining of claim 1, wherein said substantially limp foil means is attached to said first surface area by adhesive.

13. The lining of claim 1, wherein said substantially limp fibrous web means is attached to said second of said surface areas by adhesive.

14. A lining for interior portions of an automotive vehicle, comprising:
   support means comprising a substantially rigid unitary foundation panel including a substantially uninterrupted groove penetrating into said panel to a predetermined depth and partitioning said panel into first and second contiguous surface areas one of which is elevated relative to the other;
   substantially limp foil means covering at least said first surface area and having a portion inserted in said groove;
   substantially limp fibrous web means positioned in intimate contact on said second of said surface areas and having a marginal portion of a width not exceeding the depth of said groove and inserted therein; and
   means for frictionally retaining said portion of said foil means and said marginal portion of said fibrous web means in said groove.

15. The lining of claim 14, wherein said means for frictionally retaining said portion of said foil means and said marginal portion of said fibrous web means in said groove comprises a combined thickness of said portion and marginal portion in excess of the width of said groove.

16. A lining for interior portions of an automotive vehicle, comprising:
   support means comprising a substantially rigid unitary foundation panel including a substantially uninterruped groove penetrating into said panel to a predetermined depth and partitioning said panel into first and second contiguous surface areas;
   substantially limp foil means positioned in intimate contact on said first surface area and having a marginal portion of a width not exceeding the depth of said groove and inserted therein;
   substantially limp fibrous web means positioned in intimate contact on said second surface area and having a marginal portion of a width not exceeding the depth of said groove and inserted therein;
   said marginal portions of said foil means and said fibrous web means having a combined thickness in excess of the width of said groove whereby said marginal portions are retained in said groove by a press fit and impart a joint-like appearance.

* * * * *